3,283,212
OVERLOAD PROTECTION CIRCUIT
Cecil Glynn Davis, Garland, and Darrel Willis Martin, Dallas, Tex., assignors to the United States of America as represented by the Secretary of the Army
Filed Jan. 18, 1963, Ser. No. 252,539
4 Claims. (Cl. 317—22)

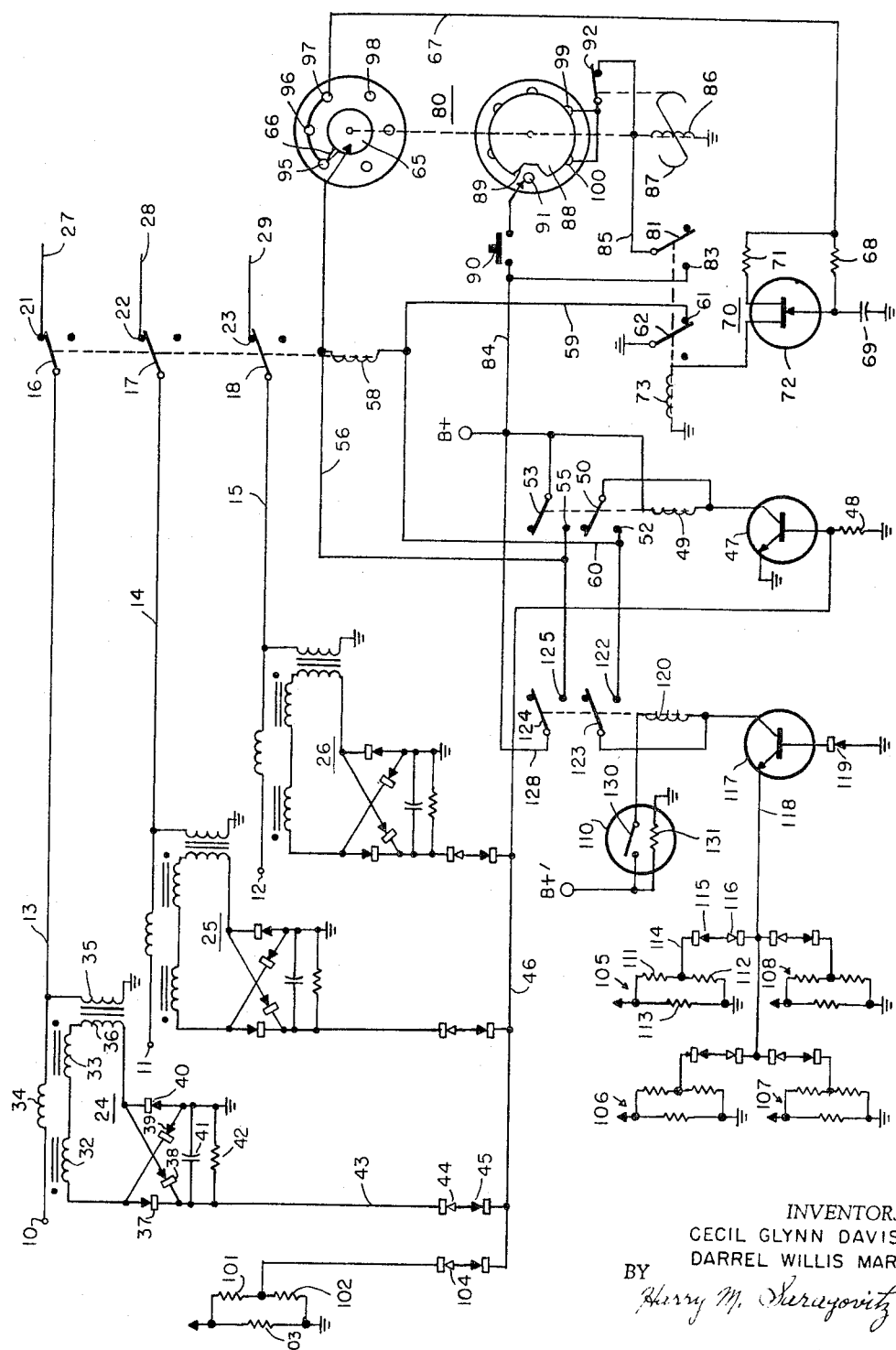

The present invention relates to an overload protection circuit and more particularly to a power recycling system wherein the power to a utilization device is turned off for a short period of time if an overload has been sensed in the power supply and then turned back on to determine if the overload has been cleared. This cycle is repeated until the overload is cleared or until some predetermined number of cycles is completed after which the power is then shut off permanently.

It has been a problem in the field of radar to find some system which will protect a radar set from short time overloads while permitting the radar to continue on with its intended mission after the overloads have been cleared. Such a device will be particularly useful in radars which are necessarily unattended such as those found in pilotless missiles and the like. It would therefore be desirable that such a device automatically remove the power from the radar while the overload exists and then subsequently turn the power back on after the overload is cleared so the radar may continue to perform its intended functions. However, it is also desirable that the radar be turned off permanently if the overload should persist. Such protection devices should be both light and small so that their use in airborne missiles is practical.

It is therefore an object of the invention to provide an overload protection circuit which will sense short time overloads in a power supply to a utilization device.

Another object is to provide an overload protection circuit wherein the utilization circuit is permitted to operate after the overload has been cleared.

A further object of the invention is to provide an overload protection circuit wherein the overload is sensed quickly and the device is both small and light.

The exact nature of this invention as well as other objects and advantages thereof will be readily apparent from consideration of the following specification relating to the annexed drawing which shows a preferred embodiment of an overload protection circuit.

Referring to the drawing, there are shown three terminals 10, 11 and 12 for a three phase, A.-C., power input to a utilization system such as a radar. These terminals are connected by lines 13, 14 and 15 to normally closed switches having armatures 16, 17 and 18, and contacts 21–23. These contacts connect the power supply to the utilization circuit through lines 27, 28 and 29.

Magnetic amplifiers 24, 25 and 26 are coupled to the power supply lines 13, 14 and 15, respectively. All three amplifiers are similar in operation and construction and therefore only one will be described in detail. Magnetic amplifier 24 has two coils 32 and 33 which are connected in series opposition as indicated by the dots on the drawing. Each coil 32 and 33 is magnetically coupled to a coil 34 in line 13. A three legged core or two separate cores may be used as the coupling member. There is, however, no magnetic coupling between coils 32 and 33. Magnetic amplifier 24 also contains a secondary coil 36 magnetically coupled to a primary coil 35 of a transformer. Coil 35 is connected between line 13 and ground. Amplifier 24 also contains a full wave rectifier having diodes 37–40 and a parallel connected resistor 42 and capacitor 41. One side of the resistor 42 is connected to ground while the other side is connected to a line 43 having a Zener diode 44 and a rectifier 45.

The magnetic amplifier 24 is used here as a current sensing device and its operation will now be described. The voltage of line 13 is used as the source of a reference voltage and by way of primary coil 35 a voltage is induced in the secondary coil 36 of amplifier 24. Under normal conditions (i.e., normal current in line 13) the impedance of amplifier 24 is large due to coils 32 and 33 where only a small amount of flux exists in the coupling core. Only a small amount of current will flow through coils 32 and 33 from coil 36 due to this high impedance and therefore only a small voltage drop will exist across resistor 42. However, if the current in line 13 should rise to some undesirable amount the core linking coil 34 with coils 32 and 33 will become saturated with flux and thereby reduce substantially the impedance of coils 32 and 33. Under this condition a large amount of current will flow in the last-named coils and therefore produce a large voltage drop across resistor 42. As stated previously diodes 37–40 make up a full wave rectifier so that the drop across resistor 42 will always be in the same direction. Capacitor 41 is provided to smooth out the voltage across resistor 42 and to reduce transient effects. Since the coils 32 and 33 are connected in series opposition and since either a three legged core or two separate cores are used for coupling these coils to coil 34, there will be no induced A.-C. effects in line 13 from the magnetic amplifier. If the voltage and current in line 13 are in phase it can be seen that the cumulative effects of a rising current in line 13 causing a lower impedance of coils 32 and 33 and the rising voltage across secondary 36 will create a large voltage drop across resistor 42. However, the current and voltage in line 13 need not be in phase so long as the voltage across secondary 36 is sufficient to cause a large enough voltage drop across resistor 42 when the impedance of coils 32 and 33 are at a minimum.

It can therefore be recognized that if some overload should exist in line 13 it will immediately cause an increase in voltage across resistor 42. Zener diode 44 will break down under this increase in voltage, which voltage is then applied to line 46 and will turn on a normally cut off NPN transistor 47 having collector, emitter and base terminals. The base terminal is connected to line 46 and to a bias resistor 48 which is connected to ground. The emitter is connected to ground while the collector is connected to a B+ voltage source through a coil 49. The collector is also connected to a normally open switch having an armature 50 and a contact 52. An armature 53 of another normally open switch having a contact 55 is connected to the B+ voltage. Coil 49 along with the switches having armatures 50 and 53 make up a relay. When an overload is detected in either of lines 13 or 14 or 15, transistor 47 is turned on and a circuit from the B+ voltage to ground is completed through coil 49 which in turn moves armatures 50 and 53 against contacts 52 and 55 respectively. Upon closing these switches current will be supplied to coil 58 by completing a circuit from B+ through armature 53, contact 55, line 56, coil 58, line 59, contact 61, armature 62 and ground. Coil 58 along with the switches in lines 13, 14 and 15 make up a relay which shuts the power off to the utilization device when coil 58 is energized. B+ voltage is also applied to a timing circuit 70 and current will flow from B+ through armature 53, contact 55, line 56, disc 65 of a stepping relay 80, brush 66, contact 95, line 67, resistor 68 to capacitor 69. This B+ voltage will also appear across resistor 71, unijunction transistor 72 and coil 73. Initially there will be only a nominal amount of current flowing through the base terminals of transistor 72. However, after a predetermined time determined by the RC time constant of resistor 68 and capacitor 69, the latter will charge up to a voltage which is sufficient to permit discharge of the capacitor 69 through the emitter of transistor 72 and through the coil 73. With sufficient current flowing through coil 73 armature 62 is removed from contact 61, thereby removing the ground from coil 58 whereby the switches in lines 13, 14 and 15 are permitted to close and power is once against applied to the utilization device. If for some reason the overload detected was only temporary the device is permitted to continue on with its mission. If, however, the overload is still present, the cycle will be repeated and the power will be shut off again for a short period of time to permit the overload to be cleared.

It is desirable that the power be kept off for the entire period of time as determined by the timing circuit 70. Otherwise, the cycle would end as soon as the power was removed from the utilization device. This may not give the utilization device a chance to correct any temporary overload. To prevent this situation the relay containing coil 49 is made self locking by providing a ground connection for coil 49 to supplement the ground connection through transistor 47. Armature 50 having been moved against contact 52 by coil 49 provides a ground through line 60, contact 61 and armature 62. This ground is removed however when coil 73 is energized.

It is also desirable that only a limited number of cycles should be permitted so that the utilization device will not be damaged should the overload persist. To this end a counting circuit is provided in the form of a stepping relay 80. When coil 73 is energized a normally open switch having an armature 81 is closed by moving armature 81 against contact 83. This puts B+ voltage on the stepping relay by completing the circuit from B+ through line 84, contact 83, armature 81, line 85, coil 86 to ground. Coil 86 is then energized and rotates armature 87 which rotates discs 65 and 88 so that brush 66 and notch 89 will move to a position adjacent the next contact in a clockwise direction. After a predetermined number of cycles (in the case shown there are three cycles provided) brush 66 will move off the common contacts 95, 96 and 97 to a dummy contact 98 thereby opening the circuit from B+ through the stepping relay 80, the timing circuit 70 and ground. Under this condition coil 73 cannot be energized and armature 62 will not be moved to remove ground from coil 58. Therefore, the power to the utilization circuit will be permanently cut off until relay 80 is reset. The stepping relay 80 may be reset by manually depressing reset button 90 which will complete a circuit comprising B+, line 84, button 90, contact 91, disc 88, contact 99 or 100, spring switch 92, coil 86 and ground. Coil 86 is then energized and armature 87 will oscillate by making and breaking spring switch 92 thereby moving discs 65 and 88 one step at a time until notch 89 is in the position shown in the drawing. Brush 66 will then be in contact with the contact member 95.

It can be seen from the foregoing that if an overload should appear in any of the three leads in a three phase power supply to the utilization device, a voltage will appear on line 46 thereby operating a circuit which will turn off the power supply for a period of time and then turn the power back on to determine if the overload has been cleared. If the overload has not been cleared the cycle is repeated until the overload is cleared or until some predetermined number of cycles have been completed at which time the power is shut off permanently.

The low voltage D.-C. supplies which are present in a utilization device such as a radar may also be protected with this circuit by utilizing the same cycling sequence.

A voltage divider having resistances 101 and 102 is connected in parallel with a resistor 103 in the ground lead of some D.-C. supply such as a voltage regulator. If the current in the ground lead should become unreasonably high, the voltage drop across resistor 103 will be large making the voltage across resistor 102 rise and eventually break down a Zener diode 104. The voltage will then turn on transistor 47 in the same manner as explained earlier and thereby turn off the three phase power supply.

Some of the D.-C. power supplies in a radar system are delayed several minutes before coming on to permit the system to warm up. Normally when these power supplies finally come on transients are produced by the charging of filter capacitors, etc. These transients will be sensed as overloads if not disregarded. The present circuit makes provision for this by providing a delay relay 110.

Voltage dividers are connected in parallel across the resistors in the ground leads of the radar rectifier circuits to form circuits 105–108. In circuit 105, which is similar to circuits 106–108, a voltage divider having resistors 111 and 112 is connected across the resistor 113 in the ground lead of the rectifier circuit supplying D.-C. power to the radar. Connected from the voltage divider is a line 114 having a rectifier 115 and a Zener diode 116. The Zener diode is then connected to the emitter of a normally cut off NPN transistor 117 by a line 118. The base terminal of transistor 117 is connected to ground by a diode 119 while the collector goes to a B+' voltage through a coil 120 and a delay relay 110. Also, connected to the collector of transistor 117 is the armature 123 of a normally open switch having a contact 122. Another normally open switch with an armature 124 and a contact 125 is provided. Armature 124 is connected to the B+ voltage directly by line 128. Contact 125 is connected to contact 55 while contact 122 is connected to contact 52.

If some overload should appear in a D.-C. supply, 105 for example, the current in the ground lead will rise thus creating a large voltage drop across resistor 112. If this voltage is sufficient to break down Zener diode 116 a voltage will be applied to the emitter of transistor 117 thereby turning the transistor on. The operating voltage for transistor 117 is provided by the B+' voltage. However, this voltage is delayed by delay relay 110 to permit transients to die down in the D.-C. power supply. B+' voltage is applied to the relay 110 a short time after the radar D.-C. supplies come on. Current then runs through resistor 131. As resistor 131 warms up contact 130 will close and apply B+' voltage to transistor 117. When transistor 117 is turned on by an overload, current will flow through coil 120 thereby moving armatures 123 and 124 to close the switches. Since contacts 122 and 125 are connected to contacts 52 and 55, respectively, the same operations will take place as was previously described, i.e., coil 58 is energized, the three phase power is cut off, coil 120 is self energized, the timing circuit 70 is energized, the power is turned back on and the cycle is counted.

In radar circuits where the D.-C. supplies are turned on at the same time that the three phase A.-C. power comes on and the transients are reduced by using filter chokes, transistors 117 and 47 could use either coil 120 or coil 49 and their associated switches as a common relay. This would also eliminate the need for relay 110.

Obviously many other modifications and variations of the present invention are possible in the light of the above teachings. It is therefore to be understood, that within the scope of the appended claims, the invention may be practiced otherwise than as specifically described.

What is claimed is:
1. An overload protection circuit for automatically energizing a circuit breaker to disconnect the power from a utilization device upon the detection of an overload and for reclosing said circuit breaker after a prescribed period of time and for maintaining said circuit breaker energized after a prescribed number of cycles comprising; current sensing means coupled to said current carrying conductor for providing an output voltage upon sensing an overload in said current carrying conductor; switching means coupled to the output of said sensing means and responsive to said output voltage for energizing said circuit breaker and a timing means connected thereto, said timing means including relay means for deenergizing said circuit breaker after a prescribed time, stepping relay counting means advanceable in a step-by-step manner through a prescribed number of positions, the last of said steps disconnecting said timing means, and means responsive to said timing means for stepping said counting means through one of said steps for each energization of said timing means.

2. The device according to claim 1 and further including reset means for resetting said counting means to the first of said steps.

3. The device according to claim 2 and wherein said current sensing means is a magnetic amplifier having the output thereof connected to a breakdown diode.

4. The device according to claim 2 and wherein there are a plurality of current sensing means connected to said switching means.

References Cited by the Examiner
UNITED STATES PATENTS

| | | | |
|---|---|---|---|
| 2,482,524 | 9/1949 | Vrooman | 317—22 |
| 2,654,052 | 9/1953 | Mayer | 317—22 |
| 2,895,084 | 7/1959 | Siedband | 317—22 |
| 3,178,615 | 4/1965 | Miller et al. | 317—22 |

MILTON O. HIRSHFIELD, *Primary Examiner.*

SAMUEL BERNSTEIN, *Examiner.*

J. D. TRAMMELL, *Assistant Examiner.*